United States Patent
Meguro et al.

(10) Patent No.: US 7,990,708 B2
(45) Date of Patent: Aug. 2, 2011

(54) BLOWER FOR ELECTRONIC DEVICE AND ELECTRONIC DEVICE

(75) Inventors: Hiroyuki Meguro, Shizuoka (JP); Kazuhiro Takai, Aichi (JP); Hiroko Fujibayashi, Aichi (JP)

(73) Assignees: Sony Corporation, Tokyo (JP); Sony Ericsson Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 12/620,644

(22) Filed: Nov. 18, 2009

(65) Prior Publication Data

US 2010/0124019 A1   May 20, 2010

(30) Foreign Application Priority Data

Nov. 19, 2008 (JP) ................. P2008-296136

(51) Int. Cl.
*H05K 7/20* (2006.01)
*F04D 29/66* (2006.01)
(52) U.S. Cl. .............. 361/695; 415/213.1; 454/184
(58) Field of Classification Search ............ None
See application file for complete search history.

(56) References Cited

U.S. PATENT DOCUMENTS

| | | | | |
|---|---|---|---|---|
| 4,560,320 A | * | 12/1985 | Baus | 415/118 |
| 5,492,456 A | * | 2/1996 | Knight et al. | 417/360 |
| 5,649,587 A | * | 7/1997 | Plant | 165/41 |
| 7,186,075 B2 | * | 3/2007 | Winkler et al. | 415/119 |
| 7,289,321 B2 | * | 10/2007 | Patel et al. | 361/695 |
| 7,363,961 B2 | * | 4/2008 | Mori et al. | 165/41 |
| 7,530,890 B2 | * | 5/2009 | Chen | 454/184 |
| 7,545,641 B2 | * | 6/2009 | Chen | 361/695 |

FOREIGN PATENT DOCUMENTS

JP          2000 27799          1/2000

* cited by examiner

*Primary Examiner* — Boris L Chervinsky
(74) *Attorney, Agent, or Firm* — Frommer Lawrence & Haug LLP; William S. Frommer; Thomas F. Presson (57) ABSTRACT

A blower for an electronic device includes a fan frame having an opening through which air passes for cooling the electronic device; a blade arranged in the opening of the fan frame; a motor configured to rotationally drive the blade; an attachment portion provided outside the opening of the fan frame, the attachment portion causing the fan frame to be attached to the electronic device; and a holder fixed to the electronic device and holding the attachment portion in a direction perpendicular to a rotational axis of the blade.

4 Claims, 8 Drawing Sheets

Related Art

FIG. 8

BLOWER FOR ELECTRONIC DEVICE AND ELECTRONIC DEVICE

BACKGROUND OF THE INVENTION

1. Field of the Invention

The present invention relates to a blower for an electronic device and an electronic device. The blower is used for an electronic device such as a projection display apparatus which displays an image on a screen or the like by projecting light on the screen. In particular, the present invention relates to a technique capable of reducing an installation space of a blower in an electronic device and decreasing the size of the electronic device.

2. Description of the Related Art

For example, an electronic device may be a projection display apparatus (liquid crystal projector etc.) including a light source such as a lamp unit supported by a reflector, a light valve which modulates light emitted from the light source, and a projector lens which projects an image. The projection display apparatus obtains the image by irradiating the light valve with the light emitted from the lamp unit, and displays the image on a screen or the like through the projector lens. The projection display apparatus generates heat when being used. A blower exhausts the heat from the inside of a case of the projection display apparatus to the outside. Hence, the blower cools various components with heat (i.e., the lamp unit etc.) so that the temperatures of the components are held at an assurance limit temperature or lower.

For example, the blower may be an exhaust fan including a fan frame having an opening for ventilation, a motor arranged in the opening while being supported by the fan frame through a support portion, and blades provided rotatably with rotation of the motor and blowing air along a rotational axis of the blades by the rotation. Also, a plurality of attachment portions for bushes are provided at a plurality of positions at an outer peripheral portion of the fan frame. A rubber bush is attached to each attachment portion, and the fan frame is fixed to a subject of the attachment by an attachment screw (for example, see Japanese Unexamined Patent Application Publication No. 2000-27799).

SUMMARY OF THE INVENTION

In the technique in Japanese Unexamined Patent Application Publication No. 2000-27799, a screwing direction of the attachment screw is parallel to the rotational axis of the blades. Owing to this, the attachment portion for attaching the fan frame is provided in the outer peripheral portion of the fan frame at a position sufficiently separated from the blades, to prevent the attachment screw from interfering with the blades.

Figure 8:
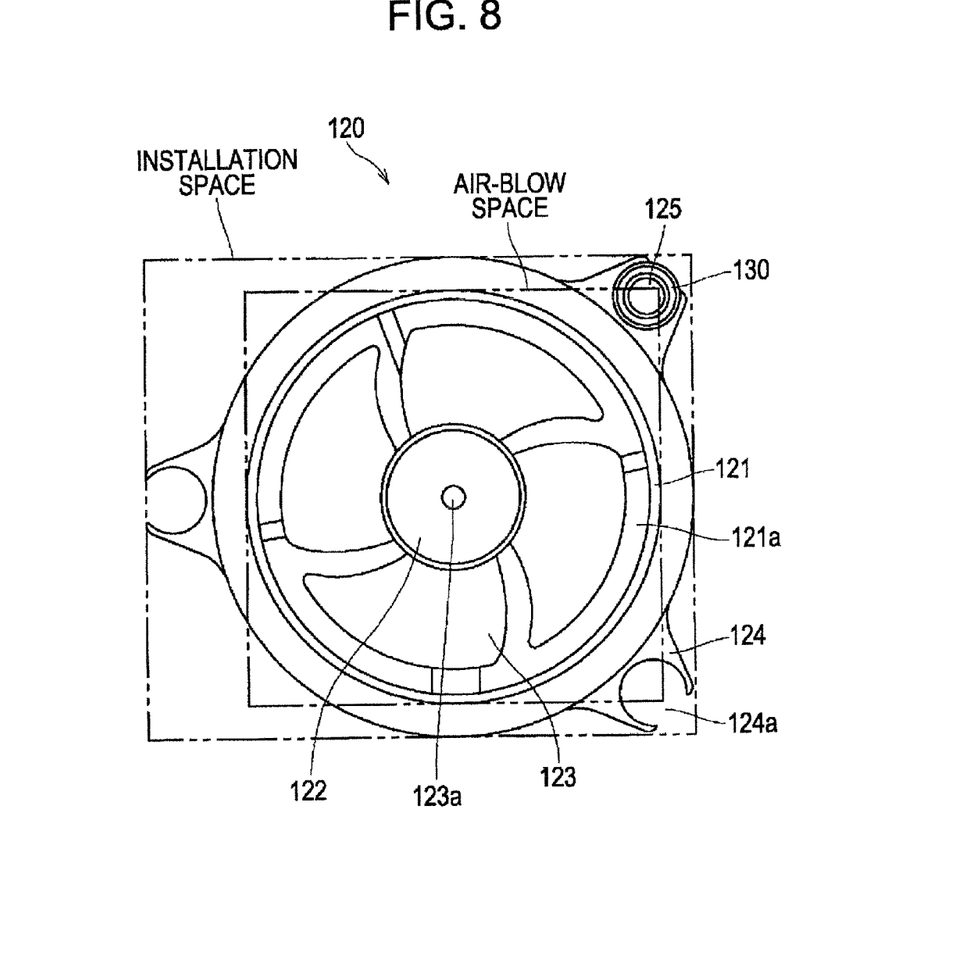
FIG. 8 is a front view showing an exhaust fan as an example of related art.

FIG. 8 is a front view showing an exhaust fan 120 as an example of a blower of such related art.

Referring to FIG. 8, the exhaust fan 120 includes a fan frame 121 having an opening 121a for ventilation, a motor 122 of outer-rotor type supported by the fan frame 121 and arranged in the opening 121a, and four blades 123 which blow air along a rotational axis of the blades 123 by the rotation.

Also, attachment portions 124 are provided at three positions in an outer peripheral portion of the fan frame 121. Each attachment portion 124 has a notch 124a. A rubber bush 130 is attached to each attachment portion 124 through the corresponding notch 124a. To install the fan frame 121 to an electronic device (e.g., liquid crystal projector), an attachment screw 125 is inserted into the bush 130 in a direction parallel to a rotational axis 123a of the blades 123 to provide screw fixation.

When the exhaust fan 120 is installed to the electronic device such as the liquid crystal projector, a necessary installation space corresponds to a range of a virtual rectangle circumscribing the attachment portions 124. In contrast, when installation to the electronic device is not considered, but a minimum air-blow space necessary for supporting the motor 122 and blowing air by the blades 123 is considered, the air-blow space is the virtual rectangle circumscribing the fan frame 121. Hence, the exhaust fan 120 of related art uses a significantly large installation space with respect to the air-blow space.

In light of this, it is desirable to reduce an installation space of a blower in an electronic device and decrease the size of the electronic device.

A blower for an electronic device, according to an embodiment of the present invention, includes a fan frame having an opening through which air passes for cooling the electronic device; a blade arranged in the opening of the fan frame; a motor configured to rotationally drive the blade; an attachment portion provided outside the opening of the fan frame, the attachment portion causing the fan frame to be attached to the electronic device; and a holder fixed to the electronic device and holding the attachment portion in a direction perpendicular to a rotational axis of the blade.

An electronic device according to another embodiment of the present invention includes a case housing a component with heat; a fan frame having an opening through which air passes for cooling the component; a blade arranged in the opening of the fan frame; a motor configured to rotationally drive the blade; an attachment portion provided outside the opening of the fan frame, the attachment portion causing the fan frame to be attached to the case; and a holder fixed to the case and holding the attachment portion in a direction perpendicular to a rotational axis of the blade.

With the embodiments, the attachment portion is provided outside the opening of the fan frame to attach the fan frame to the electronic device (case). The attachment portion is held by the holder in the direction perpendicular to the rotational axis of the blade, the holder fixed to the electronic device (case). Unlike the exhaust fan 120 of related art shown in FIG. 8, it is not necessary to insert the attachment screw 125 for screw fixation in the direction parallel to the rotational axis 123a of the blades 123. Thus, the attachment portion 124 does not have to be sufficiently separated from the blades 123 to prevent the attachment screw 125 from interfering with the blades 123.

With the embodiments, since the attachment portion for attaching the fan frame to the electronic device (case) is held in the direction perpendicular to the rotational axis of the blade, the attachment portion can be arranged at a position close to the blade. Consequently, the installation space of the blower to the electronic device can be reduced, and the size of the electronic device can be decreased.

DESCRIPTION OF THE PREFERRED EMBODIMENTS

Preferred embodiments (called embodiments hereinafter) to implement the present invention will be described below with reference to the drawings.

It is assumed that an electronic device in the following embodiments of the present invention is a liquid crystal projector 10 which is a projection display apparatus. In addition, it is assumed that a blower in the following embodiments of the present invention is an exhaust fan 20 installed in the liquid crystal projector 10.

[Example Configuration of Electronic Device (Liquid Crystal Projector 10)]

Figure 1:
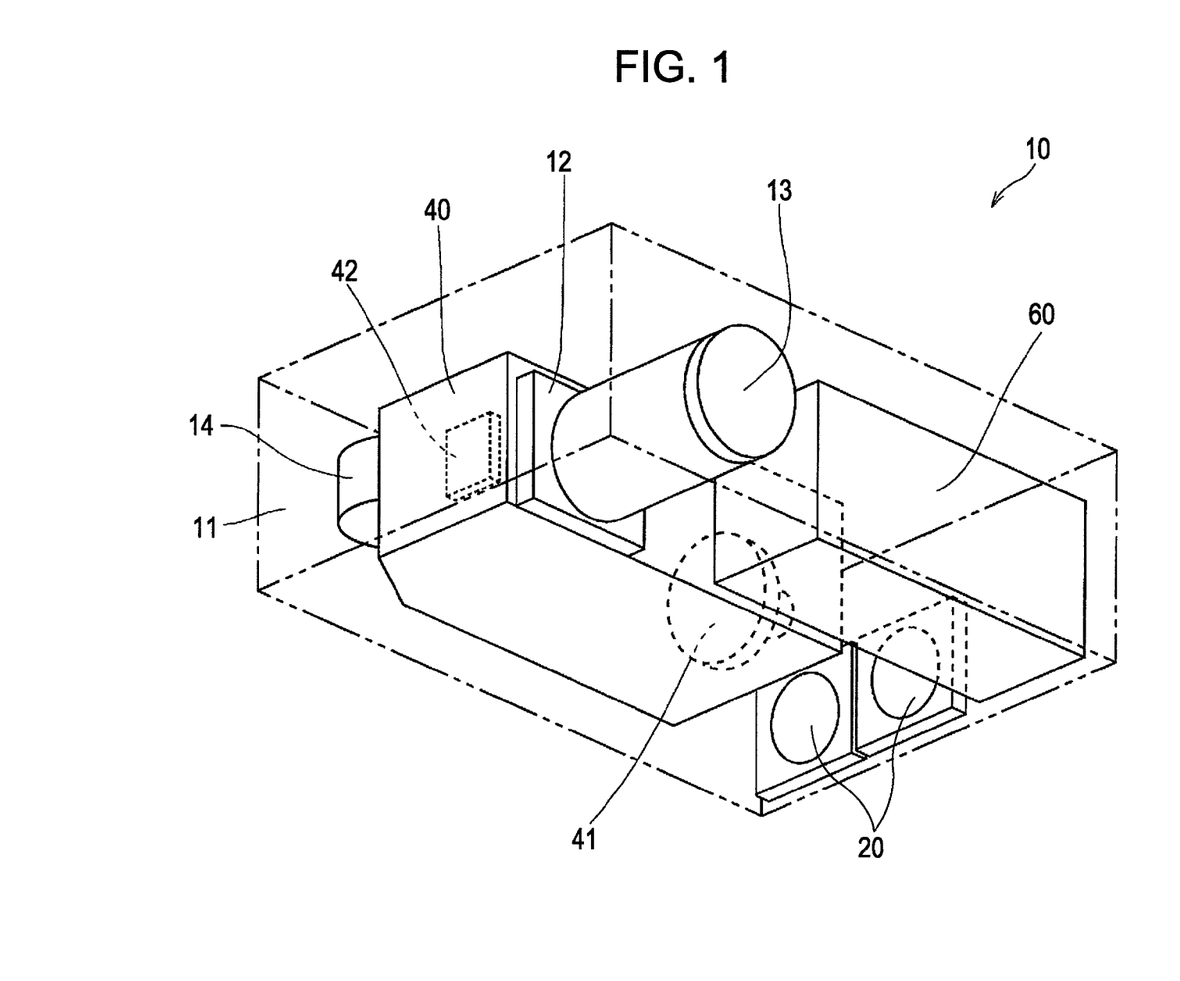
FIG. 1 is a perspective view showing an inner structure of a liquid crystal projector as an electronic device according to an embodiment of the present invention.

FIG. 1 is a perspective view showing an inner structure of a liquid crystal projector 10 as an electronic device according to an embodiment of the present invention.

Figure 2:
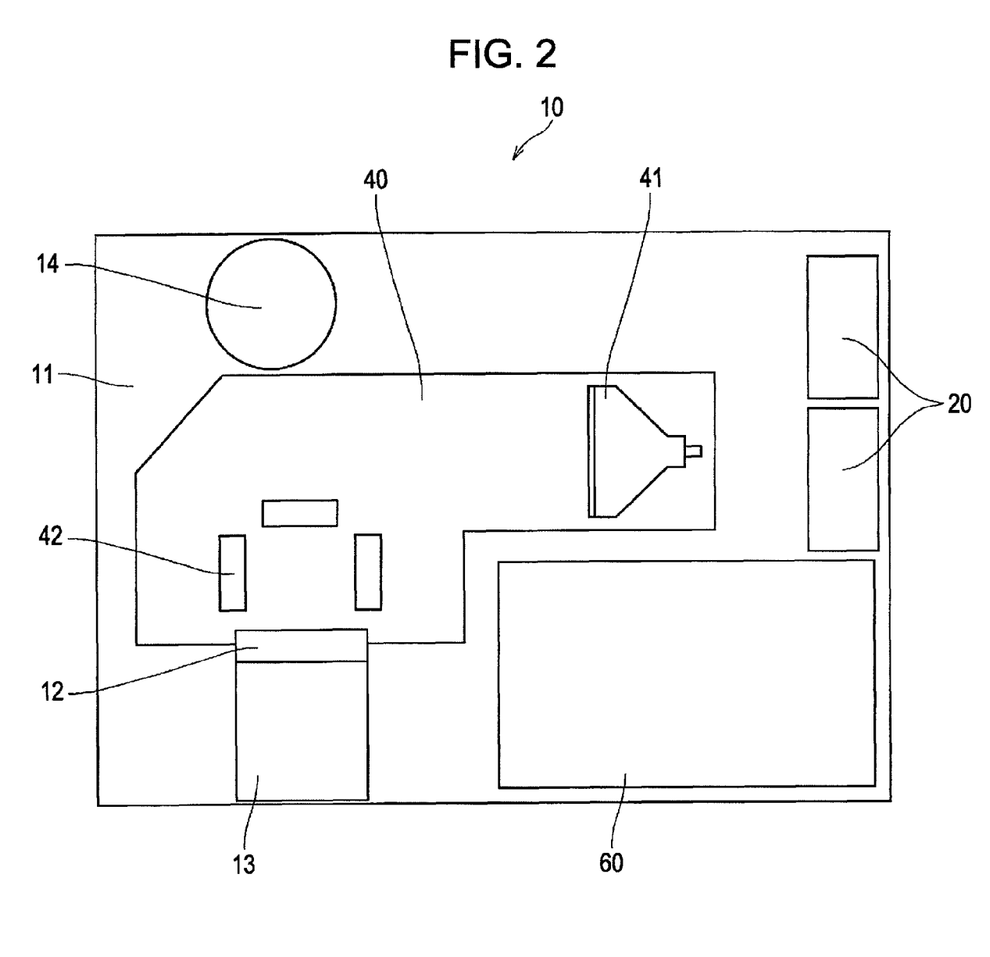
FIG. 2 is a plan view showing the inner structure of the liquid crystal projector as the electronic device according to the embodiment of the present invention.

FIG. 2 is a plan view showing the inner structure of the liquid crystal projector 10 as the electronic device according to the embodiment of the present invention.

Figure 3:
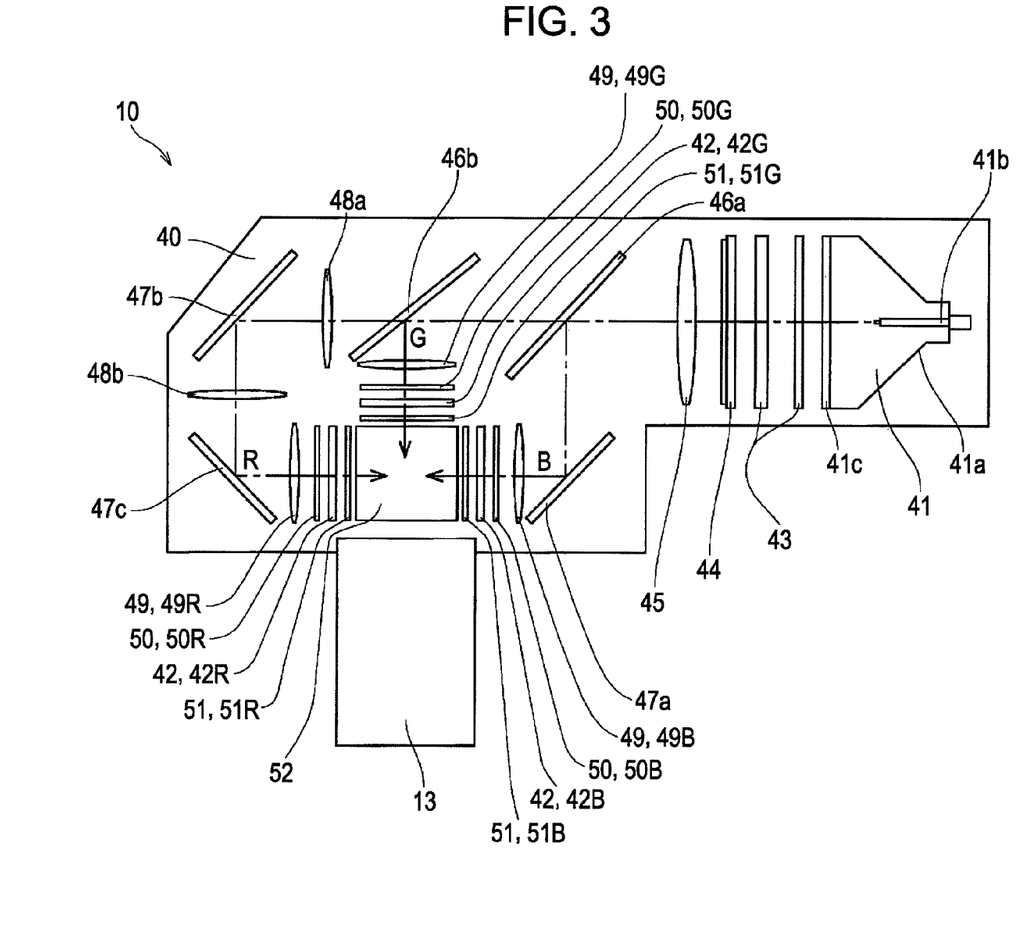
FIG. 3 is a plan view showing an inner structure of an optical unit in the liquid crystal projector as the electronic device according to the embodiment of the present invention.

FIG. 3 is a plan view showing an inner structure of an optical unit 40 in the liquid crystal projector 10 as the electronic device according to the embodiment of the present invention.

The liquid crystal projector 10 has installed therein the exhaust fan 20 as a blower according to an embodiment of the present invention.

Referring to FIGS. 1 and 2, the liquid crystal projector 10 includes a substantial rectangular-parallelepiped case 11. The case 11 houses an optical unit 40 and a power unit 60. The optical unit 40 includes a lamp unit 41 which emits light for projecting an image, and a light valve 42 which modulates the light emitted from the lamp unit 41. A lens holding frame 12 is attached to a side surface of the optical unit 40 near the light valve 42. A projector lens 13 which projects an image is held by the lens holding frame 12. A tip end portion of the projector lens 13 protrudes from a side surface of the case 11. An image is obtained by irradiating the light valve 42 with the light emitted from the lamp unit 41. The image is projected on a screen or the like through the projector lens 13.

Referring to FIG. 3, the optical unit 40 includes therein, in addition to the lamp unit 41 and the light valve 42 (42R, 42G, 42B), a fly-eye lens 43, a PS conversion element 44, a condenser lens 45, dichroic mirrors 46a and 46b, total reflection mirrors 47a, 47b, and 47c, relay lenses 48a and 48b, a field lens 49 (49R, 49G, 49B), an incident-side polarizing plate 50 (50R, 50G, 50B), an exit-side polarizing plate 51 (51R, 51G, 51B), and a cross prism 52. A light valve 42R modulates light in a wavelength range of red (R) among the light emitted from the lamp unit 41. A light valve 42G modulates light in a wavelength range of green (G). A light valve 42B modulates light in a wavelength range of blue (B). The field lens 49, the incident-side polarizing plate 50, and the exit-side polarizing plate 51 are provided for each of the light valves 42R, 42G, and 42B.

Describing optical components in the optical unit 40 from the exit side of light, the lamp unit 41 includes a reflector 41a and a discharge lamp 41b attached to the reflector 41a. A protection glass 41c is attached to an opening of the reflector 41a. Light emitted from the discharge lamp 41b is reflected by the reflector 41a, and emitted through the projection glass 41c.

Fly-eye lenses 43 are arranged at two positions separated from the lamp unit 41. The fly-eye lenses 43 divide the light with an intensity distribution from the lamp unit 41 into multiple light spots, to provide a uniform luminance distribution in an entire screen of the light valve 42 (42R, 42G, 42B).

The PS conversion element 44 and the condenser lens 45 are arranged at positions near the fly-eye lenses 43 in that order from the fly-eye lenses 43. The PS conversion element 44 includes polarizing beam splitters arrayed in stripes, and phase plates intermittently arranged in correspondence with the polarizing beam splitters. The PS conversion element 44 converts a polarizing direction of incident light.

The dichroic mirrors 46a and 46b are located opposite to the PS conversion element 44 with respect to the condenser lens 45. The dichroic mirrors 46a and 46b are separated from the condenser lens 45 by predetermined distances. The dichroic mirrors 46a and 46b are separated from one another by a predetermined distance and inclined at 45° in the same direction with respect to the condenser lens 45. The dichroic mirror 46a reflects by 90° the light in the wavelength range of blue (B) among the light transmitted through the condenser lens 45. The dichroic mirror 46b reflects by 90° the light in the wavelength range of green (G) among the light in wavelength ranges which is not reflected by the dichroic mirror 46a. The total reflection mirror 47a, which is separated from the dichroic mirror 46a, reflects by 90° the light in the wavelength range of blue (B) reflected by the dichroic mirror 46a.

Thus, only the light in the wavelength range of red (R) among the light transmitted through the condenser lens 45 is not reflected by the dichroic mirror 46a or 46b, and transmitted therethrough. The relay lens 48a and the total reflection mirror 47b are separately arranged downstream of the dichroic mirror 46b. The total reflection mirror 47b reflects by 90° the light in the wavelength range of red (R). The light in the wavelength range of red (R) is transmitted through the separately arranged relay lens 48b, and is reflected by the total reflection mirror 47c by 90°.

Thusly, the dichroic mirrors 46a and 46b separate the light into the light in the wavelength range of red (R), the light in the wavelength range of green (G), and the light in the wavelength range of blue (B). The light in the wavelength range of blue (B) reflected by the total reflection mirror 47a is incident on the field lens 49B separated from the total reflection mirror 47a. The light in the wavelength range of green (G) reflected by the dichroic mirror 46b is incident on the field lens 49G. The light in the wavelength range of red (R) reflected by the total reflection mirror 47c is incident on the field lens 49R.

The incident-side polarizing plates 50R, 50G, and 50B are separately arranged at the exit sides of the respective field lenses 49R, 49G, and 49B. Hence, the light in the wavelength ranges of red (R), green (G), and blue (B) being incident on the field lenses 49R, 49G, and 49B is transmitted through the incident-side polarizing plates 50R, 50G, and 50B and then becomes light in predetermined polarizing directions.

The light valves 42R, 42G, and 42B, functioning as optical modulators, respectively face the incident-side polarizing plates 50R, 50G, and 50B, and are separated from the incident-side polarizing plates 50R, 50G, and 50B. The light valves 42R, 42G, and 42B rotate planes of polarization of light in accordance with an image signal applied thereto. Predetermined polarized components of light, whose planes of polarization are rotated, are respectively transmitted through the exit-side polarizing plates 51R, 51G, and 51B, which are separated from the light valves 42R, 42G, and 42B. The transmitted polarized components are respectively incident on incidence surfaces (three side surfaces not provided with the projector lens 13) of the cross prism 52 as image light. The cross prism 52 combines the colors of the components. The light with the colors combined is emitted from the projector lens 13, and hence a full-color image is projected on a screen or the like.

The light emitted from the lamp unit 41 becomes the image light through the light valves 42R, 42G, and 42B. The light valves 42R, 42G, and 42B are components with heat during projecting an image. Owing to this, air has to be applied to the light valves 42R, 42G, and 42B for cooling, so as to hold the temperatures of the components at an assurance limit temperature or lower.

Referring to FIGS. 1 and 2, a cooling fan 14 is arranged behind the optical unit 40. The cooling fan 14 generates air blow to cool the components with heat. Two exhaust fans 20 are arranged at a side surface of the case 11 to face the lamp unit 41. Hence, the air from the cooling fan 14 allows the temperature of the light valve 42 of the optical unit 40 to be held at the assurance limit temperature or lower. The two exhaust fans 20 exhaust air heated because the air flows through the optical unit 40, to the outside of the case 11.

[Example Configuration of Blower (Exhaust Fan 20)]

Figure 4:
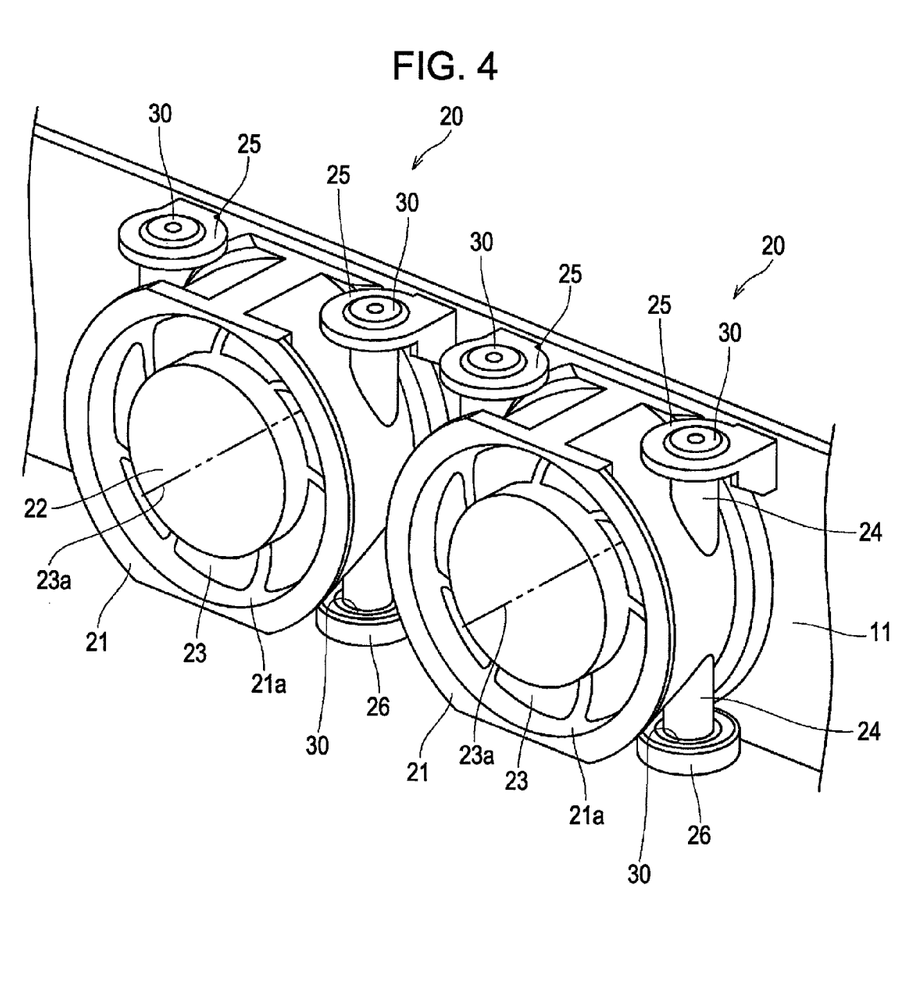
FIG. 4 is a perspective view showing two exhaust fans arranged next to one another as blowers according to an embodiment of the present invention.

FIG. 4 is a perspective view showing two exhaust fans 20 arranged next to one another as blowers according to an embodiment of the present invention.

Figure 5:
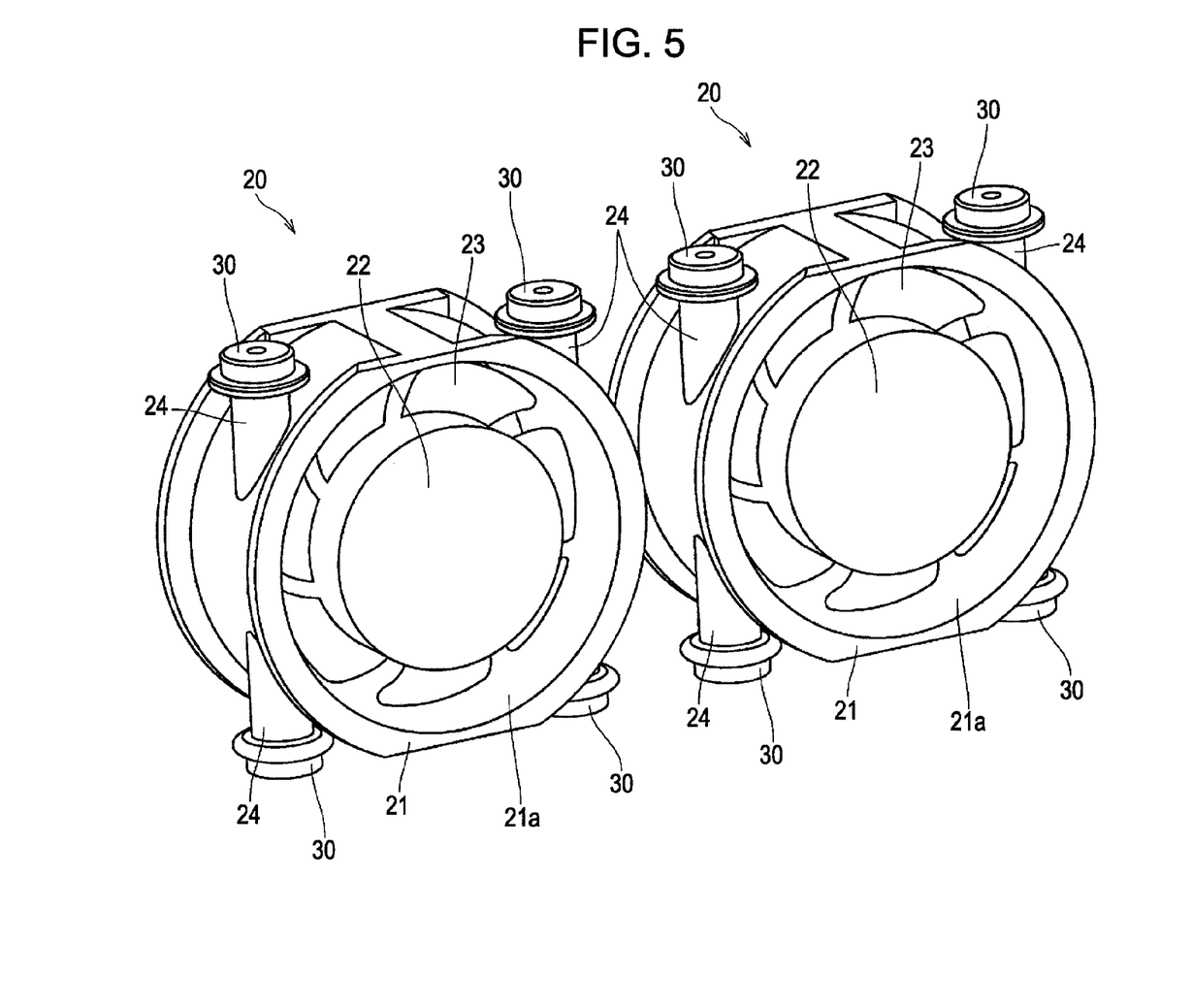
FIG. 5 is a perspective view showing the exhaust fans as the blowers according to the embodiment of the present invention, while bushes of the exhaust fans are exposed.

FIG. 5 is a perspective view showing the exhaust fans 20 as the blowers according to the embodiment of the present invention, while bushes 30 of the exhaust fans 20 are exposed.

Figure 6A:
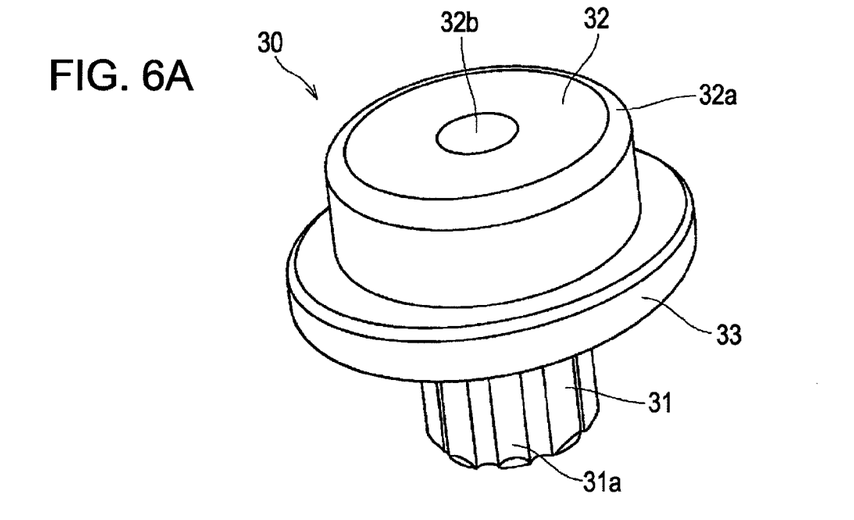
FIGS. 6A and 6B are a perspective view and a cross-sectional view showing one of the bushes of the exhaust fans as the blowers according to the embodiment of the present invention.
Figure 6B:
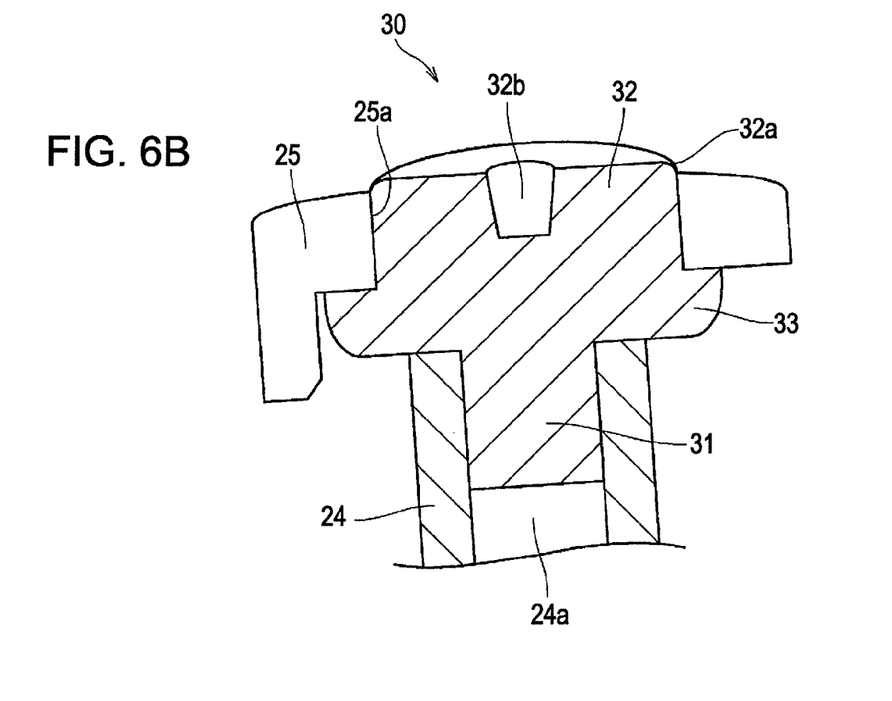

FIGS. 6A and 6B are a perspective view and a cross-sectional view showing one of the bushes 30 of the exhaust fans 20 as the blowers according to the embodiment of the present invention.

Figure 7:
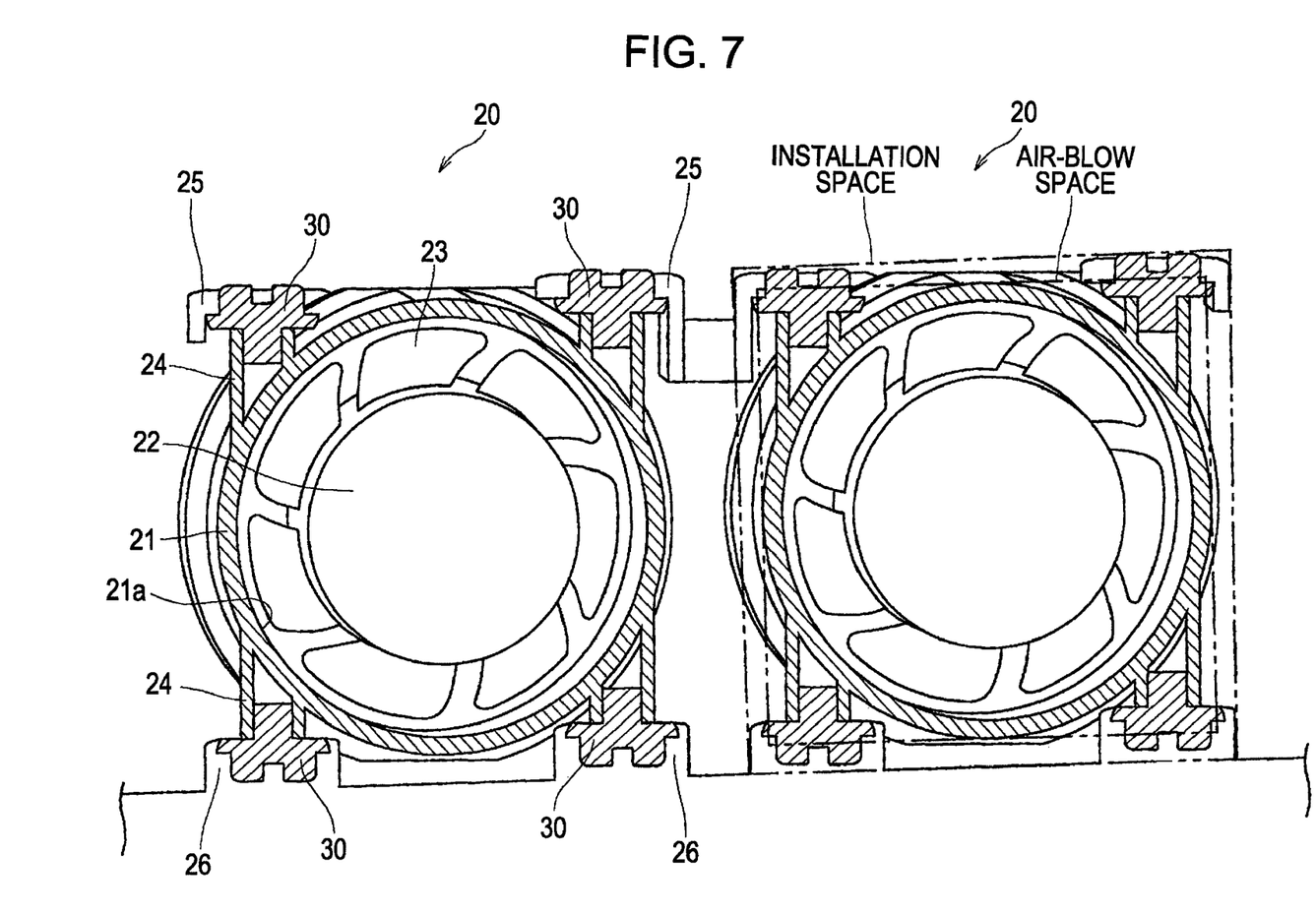
FIG. 7 is a cross-sectional view showing the two exhaust fans arranged next to one another as the blowers according to the embodiment of the present invention.

FIG. 7 is a cross-sectional view showing the two exhaust fans 20 arranged next to one another as the blowers according to the embodiment of the present invention.

Referring to FIGS. 4, 5, and 7, each exhaust fan 20 includes a substantially circular fan frame 21 having a circular opening 21a, a motor 22 located in the opening 21a coaxially with the opening 21a and supported by the fan frame 21, and seven blades 23 rotationally driven by the motor 22.

The motor 22 is outer-rotor type including a stator and a rotor. In particular, the stator includes a stator core and a stator coil. The rotor includes a rotor yoke surrounding the stator from the outside, a rotor magnet arranged to face an outer peripheral surface of the stator core, and a shaft rotatably supported by the stator through a bearing. When the stator is held in the opening 21a through a support portion, the rotor outside the stator can be rotated.

The blades 23 are integrally provided with an outer peripheral portion of the rotor yoke. The blades 23 are arranged in the opening 21a of the fan frame 21. When the motor 22 is rotationally driven, the blades 23 are continuously rotated. As a result, air blow is generated because of a difference between a pressure at a front position of each blade 23 and a pressure at a rear position of the blade 23. The generated air blow passes through the opening 21a.

Thusly, the exhaust fan 20 serves as an axial fan which applies air blow in the direction parallel to a rotational axis 23a (see FIG. 4) of the blades 23. When the exhaust fan 20 is installed in the inside of the case 11 (see FIG. 4), the air heated in the liquid crystal projector 10 (see FIGS. 1 and 2) is exhausted to the outside through the opening 21a, and the inside of the liquid crystal projector 10 can be cooled.

To install the exhaust fan 20 to the case 11 (see FIG. 4) of the liquid crystal projector 10 (see FIGS. 1 and 2), the exhaust fan 20 includes attachment portions 24. The exhaust fan 20 also includes an upper holder 25 and a lower holder 26 (see FIGS. 4 and 7), serving as holders. Bushes 30 (serving as vibration-reducing members) are inserted into a space between the attachment portion 24 and the upper holder 25 and a space between the attachment portion 24 and the lower holder 26.

Herein, four attachment portions 24 (two at the upper side and two at the lower side) are provided outside the opening 21a of the substantially circular fan frame 21. Each attachment portion 24 has an attachment hole 24a (see FIG. 6B) for the bush 30, in a direction perpendicular to the rotational axis 23a (see FIG. 4) of the blades 23. Referring to FIG. 7, assuming that a virtual rectangle (air-blow space) circumscribes the fan frame 21, all attachment portions 24 are arranged in the rectangle. The air-blow space represents a minimum space necessary for supporting the motor 22 and blowing air by the blades 23.

The bush 30 is detachably attached to each attachment portion 24. The bush 30 is made of rubber. The bush 30 prevents vibration from being transmitted to the liquid crystal projector 10 (see FIGS. 1 and 2) when vibration is generated because of rotation of the motor 22. In particular, referring to FIGS. 6A and 6B, the bush 30 includes a substantially columnar attachment protrusion 31 which is fitted into the attachment hole 24a of the attachment portion 24 and a substantially columnar holding protrusion 32 which is fitted into a holding hole 25a of the upper holder 25. A flange 33 is provided between the attachment protrusion 31 and the holding protrusion 32. One surface of the flange 33 receives an end surface of the attachment portion 24 whereas another surface of the flange 33 receives a lower surface of the upper holder 25. The holding protrusion 32 may be fitted into a holding hole of the lower holder 26 (see FIG. 7), and another surface of the flange 33 may be received by an upper surface of the lower holder 26.

The attachment protrusion 31 of the bush 30 has a plurality of threads 31a at an outer peripheral surface of the attachment protrusion 31. Hence, the attachment protrusion 31 has an uneven cross section. A tip end of each thread 31a (end opposite to the flange 33) has an inclined surface such that the diameter of the attachment protrusion 31 increases toward the flange 33. With the inclined surface of the thread 31a, the attachment protrusion 31 of the bush 30 can be easily fitted into the attachment hole 24a of the attachment portion 24. Further, the fitted bush 30 is positioned in a direction along its horizontal section by an inner peripheral surface of the attachment hole 24a and the thread 31a. Only a top of the thread 31a contacts the inner peripheral surface of the attachment hole 24a. Accordingly, a path, in which the vibration of the motor 22 (see FIG. 7) is transmitted through the attachment portion 24, is reduced. The bush 30 is positioned in a direction along its vertical section by a contact surface between the end surface of the attachment portion 24 and the flange 33.

The holding protrusion 32 of the bush 30 has a rounded corner 32a around a tip end (opposite to the flange 33) of the holding protrusion 32. The holding protrusion 32 has a hole 32b at a center position near the tip end. The bush 30 fitted into the upper holder 25 is positioned in the direction along the horizontal section by the inner peripheral surface of the holding hole 25a and the outer peripheral surface of the holding protrusion 32. The bush 30 is positioned in the direction along the vertical section by a contact surface between the lower surface of the upper holder 25 and the flange 33. The holding protrusion 32 of the bush 30 may be fitted into the holding hole of the lower holder 26 (see FIG. 7), and positioned in the directions along the horizontal and vertical sections, similarly to the upper holder 25.

Referring to FIG. 7, the bushes 30 are inserted into the space between the attachment portion 24 and the upper holder 25 and the space between the attachment portion 24 and the lower holder 26, and hence the vibration of the motor 22 can be prevented from being transmitted. The upper and lower holders 25 and 26 hold the attachment portions 24 in a direction perpendicular to the rotational axis 23a (see FIG. 4) of the blades 23. In particular, the bushes 30 are fitted into the attachment portions 24, to attain the state shown in FIG. 5. Then, the fan frame 21 is lowered in the direction perpendicular to the rotational axis 23a, and the two bushes 30 fitted into the two attachment portions 24 are fitted into the lower holders 26. The lower holders 26 are fixed to a bottom surface of the case 11 (see FIG. 4).

Then, the upper holders 25 are lowered in the direction perpendicular to the rotational axis 23a (see FIG. 4), and the two bushes 30 fitted into the two attachment portions 24 are fitted into the holding holes 25a (see FIG. 6B) of the upper holders 25. Then, the upper holders 25 are fixed to the case 11 (see FIG. 4), thereby attaining the state shown in FIGS. 4 and 7. Accordingly, the attachment portions 24 of the exhaust fan 20 are held in the direction perpendicular to the rotational axis 23a of the blades 23, and hence the exhaust fan 20 is fixed to the liquid crystal projector 10 (see FIGS. 1 and 2).

Referring to FIG. 7, when a minimum air-blow space necessary for supporting the motor 22 and blowing air by the blades 23 is considered, the air-blow space is a virtual rectangle circumscribing the fan frame 21. All attachment portions 24 are arranged in the air-blow space. Accordingly, the installation space where the bushes 30 are fitted into the attachment portions 24 and the attachment portions 24 are held in the direction perpendicular to the rotational axis 23a (see FIG. 4) of the blades 23 is merely slightly larger than the air-blow space. By properly setting the sizes of each attachment portion 24 and each bush 30, the size of the installation space can become equivalent to that of the air-blow space.

As described above, in the exhaust fan 20 of this embodiment, the installation space necessary for installing the exhaust fan 20 to the liquid crystal projector 10 (see FIGS. 1 and 2) can be reduced. In particular, the installation space can be as small as the air-blow space necessary for supporting the motor 22 and blowing air by the blades 23. Thus, when the two exhaust fans 20 are arranged next to one another, the distance between the exhaust fans 20 can be decreased. Also, the distance between the exhaust fan 20 and top and bottom surfaces of the case 11 (see FIG. 4) can be decreased. Therefore, with the exhaust fan 20 of this embodiment, the size of the liquid crystal projector 10 (see FIGS. 1 and 2) can be decreased.

In addition, the bush 30 absorbs the vibration generated because of rotation of the motor 22 during exhausting air, and hence prevents the vibration from being transmitted to the liquid crystal projector 10. In particular, since the attachment portions 24 are held by the upper and lower holders 25 and 26 without an attachment screw, the vibration can be efficiently reduced.

Furthermore, the attachment portions 24 are positioned with respect to the upper and lower holders 25 and 26 by the attachment protrusions 31, the holding protrusions 32, and the flanges 33 of the bushes 30. The bushes 30 can be easily fitted into the attachment portions 24 by the inclined surfaces of the threads 31a of the attachment protrusions 31. Also, the bushes 30 can be easily fitted into the upper and lower holders 25 and 26 by the rounded corners 32a of the holding protrusions 32. Accordingly, the exhaust fan 20 of this embodiment can be easily positioned at and attached to the liquid crystal projector 10 (see FIGS. 1 and 2).

While the embodiments of the present invention have been described above, the present invention is not limited to the above-described embodiments, and modifications can be made, for example, as follows.

(1) In the embodiments, the liquid crystal projector 10 of a projection display apparatus is an example of an electronic device. The electronic device may be various electronic devices, such as a liquid crystal display (backlight) and a notebook type personal computer (CPU).

(2) In the embodiments, the motor 22 of outer-rotor type is used and the blades 23 are integrally provided with the outer peripheral portion of the rotor. However, it is not limited thereto. A motor of other type may be used. For example, a linear motor may be installed in the fan frame, and the blades in the opening may be rotationally driven by the linear motor.

The present application contains subject matter related to that disclosed in Japanese Priority Patent Application JP 2008-296136 filed in the Japan Patent Office on Nov. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A blower for an electronic device, comprising:
a fan frame having an opening through which air passes for cooling the electronic device;
a blade arranged in the opening of the fan frame;
a motor configured to rotationally drive the blade;
an attachment portion provided outside the opening of the fan frame, the attachment portion causing the fan frame to be attached to the electronic device;
a holder fixed to the electronic device and holding the attachment portion in a direction perpendicular to a rotational axis the blade; and
a vibration-reducing member provided between the attachment portion and the holder and configured to prevent vibration, which is generated because of rotation of the motor, from being transmitted to the electronic device,
wherein the attachment portion has an attachment hole extending in the direction perpendicular to the rotational axis of the blade,
wherein the holder has a holding hole extending in the direction perpendicular to the rotational axis of the blade, and
wherein the vibration-reducing member includes
an attachment protrusion fitted into the attachment hole, and
a holding protrusion fitted into the holding hole.

2. The blower for an electronic device according to claim 1, wherein, assuming that a virtual rectangle circumscribes the fan frame, the attachment portion is arranged in the rectangle.

3. The blower for an electronic device according to claim 1, wherein the vibration-reducing member includes a flange portion between the attachment protrusion and the holding protrusion.

4. An electronic device, comprising:
a case housing a component with heat;
a fan frame having an opening through which air passes for cooling the component;
a blade arranged in the opening of the fan frame;
a motor configured to rotationally drive the blade;
an attachment portion provided outside the opening of the fan frame, the attachment portion causing the fan frame to be attached to the case;
a holder fixed to the case and holding the attachment portion in a direction perpendicular to a rotational axis of the blade; and
a vibration-reducing ember provided between the attachment portion and the holder and configured to prevent vibration, which is generated because of rotation of the motor, from being transmitted to the electronic device,
wherein the attachment portion has an attachment hole extending in the direction perpendicular to the rotational axis of the blade,
wherein the holder has a holding hole extending in the direction perpendicular to the rotational axis of the blade, and
wherein the vibration-reducing member includes
an attachment protrusion fitted into the attachment hole, and
a holding protrusion fitted into the holding hole.

* * * * *